US008350908B2

(12) United States Patent
Morris et al.

(10) Patent No.: US 8,350,908 B2
(45) Date of Patent: Jan. 8, 2013

(54) TRACKING PEOPLE AND OBJECTS USING MULTIPLE LIVE AND RECORDED SURVEILLANCE CAMERA VIDEO FEEDS

(75) Inventors: Stephen Jeffrey Morris, Harvard, MA (US); Richard Casey Clarkson, Westborough, MA (US)

(73) Assignee: VIDSYS, Inc., Vienna, VA (US)

(*) Notice: Subject to any disclaimer, the term of this patent is extended or adjusted under 35 U.S.C. 154(b) by 1085 days.

(21) Appl. No.: 12/125,122

(22) Filed: May 22, 2008

(65) Prior Publication Data
US 2008/0292140 A1 Nov. 27, 2008

Related U.S. Application Data

(60) Provisional application No. 60/939,503, filed on May 22, 2007, provisional application No. 60/939,517, filed on May 22, 2007, provisional application No. 60/939,521, filed on May 22, 2007, provisional application No. 60/939,528, filed on May 22, 2007.

(51) Int. Cl.
*H04N 7/18* (2006.01)
(52) U.S. Cl. .......................................................... 348/143
(58) Field of Classification Search .................. 348/143
See application file for complete search history.

(56) References Cited

U.S. PATENT DOCUMENTS

| | | | |
|---|---|---|---|
| 4,992,866 A | 2/1991 | Morgan | |
| 5,258,837 A | 11/1993 | Gormley | |
| 5,729,471 A | 3/1998 | Jain et al. | |
| 6,359,647 B1* | 3/2002 | Sengupta et al. | 348/154 |
| 6,437,819 B1* | 8/2002 | Loveland | 348/143 |
| 6,476,858 B1 | 11/2002 | Ramirez-Diaz et al. | |
| 6,807,361 B1 | 10/2004 | Girgensohn et al. | |
| 7,058,204 B2 | 6/2006 | Hildreth et al. | |
| 7,106,361 B2 | 9/2006 | Kanade et al. | |
| 7,116,357 B1* | 10/2006 | Oya et al. | 348/211.8 |
| 7,149,974 B2 | 12/2006 | Girgensohn et al. | |
| 7,187,783 B2 | 3/2007 | Moon et al. | |
| 7,196,722 B2 | 3/2007 | White et al. | |

(Continued)

OTHER PUBLICATIONS

Waylon Brunette, Carl Hartung, Ben Nordstrom, and Gaetano Borriello. 2003. Proximity interactions between wireless sensors and their application. In Proceedings of the 2nd ACM international conference on Wireless sensor networks and applications (WSNA '03), p. 30-37.*

(Continued)

*Primary Examiner* — Lynn Feild
*Assistant Examiner* — Taylor Elfervig
(74) *Attorney, Agent, or Firm* — Chapin IP Law, LLC

(57) ABSTRACT

Tracking a target across a region is disclosed. A graphical user interface is provided that displays, in a first region, video from a field of view of a main video device, and, in a plurality of second regions, video from a field of view of each of a plurality of perimeter video devices (PVDs). The field of view of each PVD is proximate to the main video device's field of view. A selection of one of the plurality of PVDs is received. In response, video from a field of view of the selected PVD is displayed in the first region, and a plurality of candidate PVDs is identified. Each candidate PVD has a field of view proximate to the field of view of the selected PVD. The plurality of second regions is then repopulated with video from a field of view of each of the plurality of identified candidate PVDs.

32 Claims, 6 Drawing Sheets

U.S. PATENT DOCUMENTS

| | | | |
|---|---|---|---|
| 7,222,300 | B2 | 5/2007 | Toyama et al. |
| 7,236,176 | B2 | 6/2007 | Milinusic |
| 7,242,295 | B1 | 7/2007 | Milinusic et al. |
| 7,242,423 | B2 | 7/2007 | Lin |
| 7,275,210 | B2 | 9/2007 | Girgensohn |
| 7,295,228 | B2 | 11/2007 | Roberts et al. |
| 7,310,111 | B2 | 12/2007 | Ramirez-Diaz et al. |
| 7,342,489 | B1 | 3/2008 | Milinusic et al. |
| 7,583,414 | B2 | 9/2009 | Kawai |
| 7,720,257 | B2 | 5/2010 | Morellas |
| 7,746,380 | B2 | 6/2010 | Maruya et al. |
| 7,752,548 | B2 | 7/2010 | Mercer |
| 7,777,783 | B1 | 8/2010 | Chin et al. |
| 7,797,640 | B2 | 9/2010 | Baumann |
| 7,817,716 | B2 | 10/2010 | Wells |
| 7,823,056 | B1 | 10/2010 | Davey et al. |
| 7,843,491 | B2 | 11/2010 | Vallone et al. |
| 2001/0019357 | A1* | 9/2001 | Ito et al. ............... 348/152 |
| 2002/0097322 | A1 | 7/2002 | Monroe et al. |
| 2004/0239763 | A1 | 12/2004 | Notea et al. |
| 2004/0257444 | A1* | 12/2004 | Maruya et al. ........... 348/169 |
| 2004/0263625 | A1* | 12/2004 | Ishigami et al. .......... 348/152 |
| 2005/0200717 | A1 | 9/2005 | Endo et al. |
| 2006/0221184 | A1 | 10/2006 | Vallone et al. |
| 2006/0284978 | A1 | 12/2006 | Girgensohn et al. |
| 2007/0039030 | A1 | 2/2007 | Romanowich et al. |
| 2007/0211914 | A1* | 9/2007 | Buehler ............... 382/100 |
| 2007/0279494 | A1 | 12/2007 | Aman et al. |
| 2008/0088706 | A1 | 4/2008 | Girgensohn et al. |
| 2008/0117286 | A1 | 5/2008 | Cernasov |
| 2008/0198231 | A1 | 8/2008 | Ozdemir et al. |
| 2008/0211915 | A1 | 9/2008 | McCubbrey |
| 2009/0237508 | A1 | 9/2009 | Arpa et al. |
| 2009/0262984 | A1 | 10/2009 | Hildreth et al. |
| 2010/0002082 | A1* | 1/2010 | Buehler et al. .......... 348/159 |

OTHER PUBLICATIONS

Javed, O.; Rasheed, Z.; Shafique, K.; Shah, M.; , "Tracking across multiple cameras with disjoint views," Computer Vision, 2003. Proceedings. Ninth IEEE International Conference on , vol., No., pp. 952-957 vol. 2, Oct. 13-16, 2003.*

Wei Qu; Schonfeld, D.; Mohamed, M.; , "Decentralized Multiple Camera Multiple Object Tracking," Multimedia and Expo, 2006 IEEE International Conference on , vol., No., pp. 245-248, Jul. 9-12, 2006.*

International Search Report mailed Nov. 21, 2008 in counterpart International Application Serial No. PCT/US2008/064578.

Arman et al., Content-based Browsing of Video Sequences, Siemens Corporate Research, Inc., Princeton, NJ, pp. 97-103, Multimedia, San Francisco, ACM 0-89791-686-7/94/0010, 1994.

Ardizzone et al., An Integrated Architecture for Surveillance and Monitoring in an Archaeological Site, DINFO—University of Palermo, Viale delle Scienze, ed. 6, Palermo, Italy, pp. 79-85, ACM 1-59593-242-9/05/0011, 2005.

Atrey et al., Timeline-based Information Assimilation in Multimedia Surveillance and Monitoring Systems, School of Computing, National University of Singapore, Republic of Singapore, pp. 103-112, ACM 1-59593-242-9/05/0011, 2005.

Cheung, Sen-Ching S. and Kamath, Chandrika, Robust Technique for Background Subtraction in Urban Traffic Video, Center for Applied Scientific Computing, Lawrence Livermore National Laboratory, Livermore, CA.

Cucciara, Rita, Multimedia Surveillance Systems, Dipartimento di Ingegneria dell Informazione, University of Modena and Reggio Emilia, Italy, ACM 1-59593-242-9/05/0011, 2005.

Daniel, Gareth and Chen, Min, Video Visualization, IEEI Visualization 2003, Oct. 19-24, 2003, Seattle, WA, pp. 409-416, ISBN 0-7803-8120-3.

Huston et al., Forensic Video Reconstruction, Proceedings of ACM International Workshop on Video Surveillance and Sensor Networks (VSSN), IRP-TR-04-10, Aug. 2004, Intel Coproration.

Iannizzotto et al., A Multimodal Perceptual User Interface for Videosurveillance Environments, Visilab Faculty of Engineering, University of Messina, Italy, ICMI'05, Oct. 4-6, 2005, Trento, Italy, pp. 45-52, ACM 1-59593-028-0/05/0010.

Korshunov, Pavel and Ooi, Wei Tsang, Critical Video Quality for Distributed Automated Video Surveillance, School of Computing, University of Singapore, MM'05, Nov. 6-11, 2005, Singapore, pp. 151-160, ACM 1-59593-044-2/05/0011.

Lipton et al., Critical Asset Protection, Perimeter Monitoring, and Threat Detection Using Automated Video Surveillance, ObjectVideo, Reston, VA.

Lipton, Alan J., Intelligent Video Surveillance in Crowds, ObjectVideo, Reston, VA.

Lipton, Dr. Alan J., Object Video Forensics: Activity-Based Video Indexing and Retrieval for Physical Security Applications, ObjectVideo, Reston, VA.

Pillai et al., Multi-Fidelity Storage, VSSN'04, Oct. 14, 2004, New York, NY, pp. 72-79, ACM 1-58113-934-9/04/0010.

ObjectVideo Vew, You Set the Rules. Before They Cross the Line., www.objectvideo.com, Reston, VA.

ObjectVideo Vew, You Set the Rules. Before They Cross the Line., www.objectvideo.com/products/vew/capabilities, Reston, VA.

Sebe et al., 3D Video Surveillance with Augmented Virtual Environments, Integrated Media Systems Center, University of Southern California, Los Angeles, CA, IWVS'03, Nov. 7, 2003, Berkeley, CA, pp. 107-112, ACM 1-58113-780-X/03/00011.

Wang et al., Real-Time Surveillance Video Display with Salience, Dept. of Computer Science and Engineering, The Chinese University of Hong Kong, VSSN'-5, Nov. 11, 2005, Singapore, pp. 37-43, ACM 1-59593-242-9/05/0011.

Wang et al., Experiential Sampling for Video Surveillance, IWVS'03, Nov. 7, 2003, Berkeley, CA, ACM 1-58113-780-X/00011.

Wu et al., Multi-camera Spatio-temporal Fusion and Biased Sequence-data Learning for Security Surveillance, Electrical & Computer Engineering and Computer Science, University of California, Santa Barbara, CA, MM'03, Nov. 2-8, 2003, Berkeley, CA, ACM 1-58113-722-2/03/0011.

* cited by examiner

301 PROVIDE A GRAPHICAL USER INTERFACE, WHEREIN THE GRAPHICAL USER INTERFACE DISPLAYS, IN A FIRST REGION, VIDEO FROM A FIELD OF VIEW OF A MAIN VIDEO DEVICE, AND, IN A PLURALITY OF SECOND REGIONS, VIDEO FROM A FIELD OF VIEW OF EACH OF A PLURALITY OF PERIMETER VIDEO DEVICES, THE FIELD OF VIEW OF EACH PERIMETER VIDEO DEVICE BEING PROXIMATE TO THE FIELD OF VIEW OF THE MAIN VIDEO DEVICE

302 RECEIVE A SELECTION OF ONE OF THE PLURALITY OF PERIMETER VIDEO DEVICES

IN RESPONSE

303 DISPLAY VIDEO FROM A FIELD OF VIEW OF THE SELECTED PERIMETER VIDEO DEVICE IN THE FIRST REGION

304 IDENTIFY A PLURALITY OF CANDIDATE PERIMETER VIDEO DEVICES, EACH CANDIDATE PERIMETER VIDEO DEVICE HAVING A FIELD OF VIEW THAT IS PROXIMATE TO THE FIELD OF VIEW OF THE SELECTED PERIMETER VIDEO DEVICE

305 REPOPULATE THE PLURALITY OF SECOND REGIONS WITH VIDEO FROM A FIELD OF VIEW OF EACH OF THE PLURALITY OF IDENTIFIED CANDIDATE PERIMETER VIDEO DEVICES

306 DISPLAY A MAP OF THE REGION ON THE GRAPHICAL USER INTERFACE, WHEREIN A LOCATION OF EACH OF THE PLURALITY OF VIDEO DEVICES IS IDENTIFIED ON THE MAP

307 PLACE A LINE ON THE MAP, THE LINE CONNECTING VIDEO DEVICES ACCORDING TO A SEQUENCE, THE SEQUENCE CORRESPONDING TO SELECTION OF VIDEO DEVICES, THE LINE IDENTIFYING A PATH OF THE TARGET BEING TRACKED

FIG. 3

401 PROVIDE A GRAPHICAL USER INTERFACE, WHEREIN THE GRAPHICAL USER INTERFACE DISPLAYS, IN A FIRST REGION, VIDEO FROM A FIELD OF VIEW OF A MAIN VIDEO DEVICE, AND, IN A PLURALITY OF SECOND REGIONS, VIDEO FROM A FIELD OF VIEW OF EACH OF A PLURALITY OF PERIMETER VIDEO DEVICES, THE FIELD OF VIEW OF EACH PERIMETER VIDEO DEVICE BEING PROXIMATE TO THE FIELD OF VIEW OF THE MAIN VIDEO DEVICE

402 RECEIVE A SELECTION OF ONE OF THE PLURALITY OF PERIMETER VIDEO DEVICES

IN RESPONSE

403 DISPLAY VIDEO FROM A FIELD OF VIEW OF THE SELECTED PERIMETER VIDEO DEVICE IN THE FIRST REGION

404 IDENTIFY A PLURALITY OF CANDIDATE PERIMETER VIDEO DEVICES, EACH CANDIDATE PERIMETER VIDEO DEVICE HAVING A FIELD OF VIEW THAT IS PROXIMATE TO THE FIELD OF VIEW OF THE SELECTED PERIMETER VIDEO DEVICE

405 REPOPULATE THE PLURALITY OF SECOND REGIONS WITH VIDEO FROM A FIELD OF VIEW OF EACH OF THE PLURALITY OF IDENTIFIED CANDIDATE PERIMETER VIDEO DEVICES

406 RECORD VIDEO FROM A SUBSET OF THE PLURALITY OF VIDEO DEVICES

407 PLAY A SUBSET OF THE RECORDED VIDEO BACKWARDS IN THE GRAPHICAL USER INTERFACE TO TRACK A TARGET BACK THROUGH A PERIOD OF TIME BY REPEATING THE STEPS OF RECEIVING, DISPLAYING, IDENTIFYING, AND REPOPULATING, THE SUBSET OF THE RECORDED VIDEO USED THROUGHOUT THE REPEATED STEPS

408 CEASE BACKWARDS PLAYBACK OF THE SUBSET OF THE RECORDED VIDEO AT A POINT

409 PLAY A SUBSET OF THE RECORDED VIDEO FORWARD FROM THE POINT TO TRACK A SECOND TARGET, THE SECOND TARGET TRACKED BY REPEATING THE STEPS OF RECEIVING, DISPLAYING, IDENTIFYING, AND REPOPULATING, THE SUBSET OF THE RECORDED VIDEO USED THROUGHOUT THE REPEATED STEPS

FIG. 4

```
506 PRIOR TO DISPLAYING VIDEO FROM A FIELD OF VIEW OF A VIDEO
DEVICE, IDENTIFY A PLURALITY OF FIELDS OF VIEW ASSOCIATED WITH
THAT VIDEO DEVICE, EACH FIELD OF VIEW ASSOCIATED WITH A POSITION
OF THE VIDEO DEVICE
```
▼
```
507 SELECT A FIELD OF VIEW OF THE VIDEO DEVICE THAT IS OPTIMALLY
PROXIMATE TO THE FIELD OF VIEW OF THE MAIN VIDEO DEVICE
```
▼
```
508 DIRECT THE VIDEO DEVICE TO MOVE TO THE POSITION ASSOCIATED
WITH THE SELECTED FIELD OF VIEW
```
▼
```
501 PROVIDE A GRAPHICAL USER INTERFACE, WHEREIN THE GRAPHICAL
USER INTERFACE DISPLAYS, IN A FIRST REGION, VIDEO FROM A FIELD OF
VIEW OF A MAIN VIDEO DEVICE, AND, IN A PLURALITY OF SECOND REGIONS,
VIDEO FROM A FIELD OF VIEW OF EACH OF A PLURALITY OF PERIMETER
VIDEO DEVICES, THE FIELD OF VIEW OF EACH PERIMETER VIDEO DEVICE
BEING PROXIMATE TO THE FIELD OF VIEW OF THE MAIN VIDEO DEVICE
```
▼
```
502 RECEIVE A SELECTION OF ONE OF THE PLURALITY OF PERIMETER
VIDEO DEVICES
```
▼
```
IN RESPONSE
503 DISPLAY VIDEO FROM A FIELD OF VIEW OF THE SELECTED PERIMETER
VIDEO DEVICE IN THE FIRST REGION
```
▼
```
504 IDENTIFY A PLURALITY OF CANDIDATE PERIMETER VIDEO DEVICES,
EACH CANDIDATE PERIMETER VIDEO DEVICE HAVING A FIELD OF VIEW
THAT IS PROXIMATE TO THE FIELD OF VIEW OF THE SELECTED
PERIMETER VIDEO DEVICE
```
▼
```
505 REPOPULATE THE PLURALITY OF SECOND REGIONS WITH VIDEO
FROM A FIELD OF VIEW OF EACH OF THE PLURALITY OF IDENTIFIED
CANDIDATE PERIMETER VIDEO DEVICES
```
▼
```
509 RECORD AN INITIAL POSITION OF THE VIDEO DEVICE
```
▼
```
510 UPON VIDEO FROM THE VIDEO DEVICE NO LONGER BEING DISPLAYED
IN THE GRAPHICAL USER INTERFACE, DIRECTING THE VIDEO DEVICE TO
RETURN TO THE INITIAL POSITION
```

FIG. 5

601 PROVIDE A GRAPHICAL USER INTERFACE, WHEREIN THE GRAPHICAL USER INTERFACE DISPLAYS, IN A FIRST REGION, VIDEO FROM A FIELD OF VIEW OF A MAIN VIDEO DEVICE, AND, IN A PLURALITY OF SECOND REGIONS, VIDEO FROM A FIELD OF VIEW OF EACH OF A PLURALITY OF PERIMETER VIDEO DEVICES, THE FIELD OF VIEW OF EACH PERIMETER VIDEO DEVICE BEING PROXIMATE TO THE FIELD OF VIEW OF THE MAIN VIDEO DEVICE

↓

602 RECEIVE A SELECTION OF ONE OF THE PLURALITY OF PERIMETER VIDEO DEVICES

↓

IN RESPONSE

603 DISPLAY VIDEO FROM A FIELD OF VIEW OF THE SELECTED PERIMETER VIDEO DEVICE IN THE FIRST REGION

↓

604 IDENTIFY A PLURALITY OF CANDIDATE PERIMETER VIDEO DEVICES, EACH CANDIDATE PERIMETER VIDEO DEVICE HAVING A FIELD OF VIEW THAT IS PROXIMATE TO THE FIELD OF VIEW OF THE SELECTED PERIMETER VIDEO DEVICE

606 IDENTIFY A PLURALITY OF CANDIDATE PERIMETER VIDEO DEVICES, EACH CANDIDATE PERIMETER VIDEO DEVICE HAVING A LOCATION IN A COORDINATE SPACE INDICATING ITS DISTANCE FROM THE SELECTED PERIMETER VIDEO DEVICE

607 USE THE LOCATIONS TO DISCARD ONE OR MORE CANDIDATE PERIMETER VIDEO DEVICES FROM THE PLURALITY OF CANDIDATE PERIMETER VIDEO DEVICES

608 IDENTIFY A PLURALITY OF CANDIDATE PERIMETER VIDEO DEVICES, WHEREIN AT LEAST ONE CANDIDATE PERIMETER VIDEO DEVICE HAS AN INCLUDE LIST, THE INCLUDE LIST COMPRISING ONE OR MORE VIDEO DEVICES ASSOCIATED WITH THE CANDIDATE PERIMETER VIDEO DEVICE, ANY VIDEO DEVICE ON THE INCLUDE LIST AUTOMATICALLY ADDED TO THE PLURALITY OF CANDIDATE PERIMETER VIDEO DEVICES

609 IDENTIFY A PLURALITY OF CANDIDATE PERIMETER VIDEO DEVICES, WHEREIN AT LEAST ONE CANDIDATE PERIMETER VIDEO DEVICE HAS AN EXCLUDE LIST, THE EXCLUDE LIST COMPRISING ONE OR MORE VIDEO DEVICES ASSOCIATED WITH THE CANDIDATE PERIMETER VIDEO DEVICE, ANY VIDEO DEVICE ON THE EXCLUDE LIST AUTOMATICALLY DISQUALIFIED FROM BEING PART OF THE PLURALITY OF CANDIDATE PERIMETER VIDEO DEVICES

↓

605 REPOPULATE THE PLURALITY OF SECOND REGIONS WITH VIDEO FROM A FIELD OF VIEW OF EACH OF THE PLURALITY OF IDENTIFIED CANDIDATE PERIMETER VIDEO DEVICES

FIG. 6

TRACKING PEOPLE AND OBJECTS USING MULTIPLE LIVE AND RECORDED SURVEILLANCE CAMERA VIDEO FEEDS

PRIORITY TO EARLIER FILED PROVISIONAL PATENT APPLICATIONS

This application claims the benefit of the filing date of the following earlier filed U.S. Provisional Patent Application Ser. No. 60/939,503, entitled "METHOD AND APPARATUS FOR TRACKING PEOPLE AND OBJECTS USING MULTIPLE LIVE AND RECORDED SURVEILLANCE CAMERA VIDEO FEEDS", filed on May 22, 2007; Ser. No. 60/939,517, entitled "METHOD AND APPARATUS FOR EVENT CAPTURE, CROSS DEVICE EVENT CORRELATION, AND RESPONSIVE ACTIONS", also filed on May 22, 2007; Ser. No. 60/939,521 entitled "METHOD AND APPARATUS FOR INTELLIGENT VIDEO TOURS", also filed on May 22, 2007; and Ser. No. 60/939,528, entitled "METHOD AND APPARATUS FOR OPTIMAL ROUTING OF AUDIO & VIDEO SIGNALS THROUGH HETEROGENEOUS NETWORKS", also filed on May 22, 2007. These all share co-inventorship with the present application. The entire teachings and contents of these Provisional Patent Applications are hereby incorporated by reference herein in their entirety.

BACKGROUND

Securing an area from threats, both internal to a facility and external to it, has long been a desire of those who have something of value that may be desirable to others located within the area. Early conventional security mechanisms involved placing guards at points of entry to an area to be secured. Locks of differing strengths may also have been deployed on points of entry to the area, if the area was surrounded by walls or gates. With increasing sophistication in technology, guards were also deployed within areas (i.e., inside buildings) to patrol, and badge readers and other electronic entry devices were used to supplement locks.

Guards, however, are expensive to pay, and also capable of error. Particularly for larger facilities/facilities with many possible points of entry, it may not be possible to hire enough guards to "watch" everything going on. Thus, automated devices such as security cameras have also been added to the mix of security measures. The addition of security cameras meant that security personnel could "see" all of the interesting areas of the facility (i.e., points of entry, locations were things of valued were stored, etc.). However, an increase in the number of cameras placed into a facility made it harder to watch all of the cameras simultaneously without hiring more personnel to watch the cameras. Doing so would remove the primary monetary advantage of using cameras, that is, not having to employ more personnel.

One conventional solution to the "too many cameras" problem is for security personnel to pay particular attention to a subset of all the available cameras. In this scenario, the question becomes which cameras to watch, and which cameras to ignore. Typically, the areas of high value and high risk (e.g., a vault, primary entry and exit points such as the doors going in/out of a building, etc.) are given primary focus, and other areas of lesser value and/or risk are given secondary focus. These measures have served as an adequate defense against "low tech" threats (i.e., breaking and entering by common criminals).

SUMMARY

Conventional security mechanisms such as those explained above suffer from a variety of deficiencies. One such deficiency is that tracking a moving target of interest, whether a person or an object carried by a person/people, via video feeds is difficult to do manually, particularly in areas of heavy traffic (persons or vehicles) and in areas with many obstacles that might block, even for just a moment, the view of the target. Experienced operators in, for example, a casino, may be able to track a person of interest across the gaming floor by knowing which cameras are allocated where. That is, an experienced operator knows, for example, that as a person walks from the slot machines past the craps tables to the sports book, the cameras in whose field of vision the person crosses are numbered 38, 44, 47, 58, and 63. To gain such experience and knowledge takes time and training, such that inexperienced operators may, and typically do, lose targets while tracking them. Further, even experienced operators make mistakes while engaging in manual tracking. In an open area with few people and few obstacles, it may be easy for an operator to correct that mistake, and re-acquire the target. However, particularly in crowded areas with many obstacles and constant flows of people, such as airports and casinos, once an operator has lost a target, the target is gone.

Embodiments disclosed herein thus provide for tracking of an object (person, vehicle, asset, etc.) as the object moves (or is moved) throughout a network of video devices through use of a geometry engine to calculate the nearest and/or best video devices based on video device locations and presets. The output is combined from several video devices into a single view in a user interface. More specifically, embodiments are configured with the location of a number of video devices, as well as the field of view of those video devices. Fixed video devices, that is, video devices that are unable to change position, have a set field of view. Movable video devices, that is, video devices able to receive pan-tilt-zoom (PTZ) commands, may have a number of fields of view depending on their position. All of these are available to the geometry engine.

When a user selects a video device and engages embodiments described herein, the geometry engine will select the next few most likely video devices (and thus, their fields of view) that the target will move into. Video from these devices is then displayed on the user interface. As the target moves into one of these fields of view, the user would then click on the video from the device with that field of view. That device becomes the new main video device, and embodiments recalculate appropriate surrounding devices, and display video therefrom. The cycle continues as the user continues to track the target. The video from the video devices may be recorded such that a user is able to go backwards, and forwards, to track other targets as well.

More particularly, in an embodiment, there is provided a method of tracking a target across a region using a plurality of video devices. The method includes providing a graphical user interface, wherein the graphical user interface displays, in a first region, video from a field of view of a main video device, and, in a plurality of second regions, video from a field of view of each of a plurality of perimeter video devices, the field of view of each perimeter video device being proximate to the field of view of the main video device. The method also includes receiving a selection of one of the plurality of perimeter video devices, and, in response, displaying video from a field of view of the selected perimeter video device in the first region. The method also includes, in response, identifying a plurality of candidate perimeter video devices, each candidate perimeter video device having a field of view that is proximate to the field of view of the selected perimeter video device, and repopulating the plurality of second regions with video from a field of view of each of the plurality of identified candidate perimeter video devices.

In a related embodiment, the method may include recording video from a subset of the plurality of video devices; and playing a subset of the recorded video backwards in the graphical user interface to track a target back through a period of time by repeating the steps of receiving, displaying, identifying, and repopulating, the subset of the recorded video used throughout the repeated steps. In a further related embodiment, the method may include ceasing backwards playback of the subset of the recorded video at a point; and playing a subset of the recorded video forward from the point to track a second target, the second target tracked by repeating the steps of receiving, displaying, identifying, and repopulating, the subset of the recorded video used throughout the repeated steps.

In another related embodiment, the method may include, prior to displaying video from a field of view of a video device, identifying a plurality of fields of view associated with that video device, each field of view associated with a position of the video device; selecting a field of view of the video device that is optimally proximate to the field of view of the main video device; and directing the video device to move to the position associated with the selected field of view. In a further related embodiment, the method may include recording an initial position of the video device; and upon video from the video device no longer being displayed in the graphical user interface, directing the video device to return to the initial position.

In yet another related embodiment, identifying may include identifying a plurality of candidate perimeter video devices, each candidate perimeter video device having a location in a coordinate space indicating its distance from the selected perimeter video device; and using the locations to discard one or more candidate perimeter video devices from the plurality of candidate perimeter video devices. In still another related embodiment, identifying may include identifying a plurality of candidate perimeter video devices, wherein at least one candidate perimeter video device has an include list, the include list comprising one or more video devices associated with the candidate perimeter video device, any video device on the include list automatically added to the plurality of candidate perimeter video devices. In yet still another related embodiment, identifying may include identifying a plurality of candidate perimeter video devices, wherein at least one candidate perimeter video device has an exclude list, the exclude list comprising one or more video devices associated with the candidate perimeter video device, any video device on the exclude list automatically disqualified from being part of the plurality of candidate perimeter video devices.

In still yet another related embodiment, the method may include displaying a map of the region on the graphical user interface, wherein a location of each of the plurality of video devices is identified on the map; and placing a line on the map, the line connecting video devices according to a sequence, the sequence corresponding to selection of video devices, the line identifying a path of the target being tracked. In yet still another related embodiment, receiving may include selecting one of the plurality of perimeter video devices automatically through use of analytics.

In another embodiment, there is provided a computer program product, stored on computer readable medium, for tracking a target across a region using a plurality of video devices. The computer program product includes computer program code for providing a graphical user interface, wherein the graphical user interface displays, in a first region, video from a field of view of a main video device, and, in a plurality of second regions, video from a field of view of each of a plurality of perimeter video devices, the field of view of each perimeter video device being proximate to the field of view of the main video device; computer program code for receiving a selection of one of the plurality of perimeter video devices; and in response: computer program code for displaying video from a field of view of the selected perimeter video device in the first region; computer program code for identifying a plurality of candidate perimeter video devices, each candidate perimeter video device having a field of view that is proximate to the field of view of the selected perimeter video device; and computer program code for repopulating the plurality of second regions with video from a field of view of each of the plurality of identified candidate perimeter video devices.

In another embodiment, there is provided a computer system. The computer system includes a memory; a processor; a display; a network interface; and an interconnection mechanism coupling the memory, the processor, the display, and the network interface, allowing communication there between. The memory of the computer system is encoded with a virtual tracking application, that when executed in the processor, provides a virtual tracking process that tracks a target across a region using a plurality of video devices, by causing the computer system to perform operations of: providing a graphical user interface, wherein the graphical user interface displays, in a first region, video from a field of view of a main video device, and, in a plurality of second regions, video from a field of view of each of a plurality of perimeter video devices, the field of view of each perimeter video device being proximate to the field of view of the main video device; receiving a selection of one of the plurality of perimeter video devices; and in response: displaying video from a field of view of the selected perimeter video device in the first region; identifying a plurality of candidate perimeter video devices, each candidate perimeter video device having a field of view that is proximate to the field of view of the selected perimeter video device; and repopulating the plurality of second regions with video from a field of view of each of the plurality of identified candidate perimeter video devices.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as but not limited to an optical medium (e.g., CD-ROM, DVD-ROM, etc.), floppy or hard disk, a so-called "flash" (i.e., solid state) memory medium, or other physical medium, such as but not limited to firmware or microcode in one or more ROM or RAM or PROM chips, or as an Application Specific Integrated Circuit (ASIC), or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes may run on a small set of dedicated computers, or on one computer alone.

It is to be understood that embodiments of the invention may be embodied strictly as a software program, as software and hardware, or as hardware and/or circuitry alone. The features disclosed and explained herein may be employed in computerized devices and software systems for such devices such as those manufactured by VidSys, Inc. of Vienna, Va.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when tracking a target across a region using a plurality of video devices.

FIG. 4 illustrates a flowchart of a procedure performed by the system of FIG. 1 when using recorded video to backtrack a first target in time and forward track a second target in time.

FIG. 5 illustrates a flowchart of a procedure performed by the system of FIG. 1 when moving video devices during tracking of a target and returning those devices to their original positions when they are no longer used for tracking.

FIG. 6 illustrates a flowchart of a procedure performed by the system of FIG. 1 when determining video devices that should be used or should not be used to track a target.

DETAILED DESCRIPTION

Generally, disclosed embodiments provide methods and apparatus for tracking a (moving) target across a region or other area using a plurality of video devices. A target may be a person, a group of people, an object, a number of objects, or some combination of all of these. The video devices are typically cameras, but may include other devices such as network video recorders (NVRs). The challenge for tracking a moving target is that the operator must "follow" the target by selecting the correct next video device. To aide the operator, after the operator selects a video device as a main video device, embodiments disclosed herein determine the next most likely video devices with fields of view into which the target will likely move. The video from those devices is then displayed to the operator. The operator is then able to select the video device having a field of view the target moved into, which becomes the new main video device. Embodiments then again determine the next most likely video devices with fields of view into which the target will likely move, and display their video. This process is repeated as the operator continues to track the target. Through use of NVRs, tracking a target backward through time, or starting to track based on a recorded view, and then tracking a different target forward in time is also possible. Embodiments disclosed herein may also be configured to automatically track one or more targets using analytic data, such as video analytics (i.e., facial recognition, object recognition, etc.), positional analytic data (i.e., global positioning satellite (GPS) data, data from RFID tags embedded in the target(s), etc.), or a combination thereof.

Note that, as used herein, any references to selecting, identifying, choosing, determining, picking, etc. a video device may include selecting/identifying/choosing/determining/picking a preset position associated with that video device. Thus, for a fixed (i.e., non-movable) video device, any phrase similar to selecting/identifying/choosing/determining/picking used in connection with that device means that the device itself is selected/identified/chosen/determined/picked. In contrast, for a non-fixed (i.e., movable/PTZ-type) video device, any phrase similar to selecting/identifying/choosing/determining/picking used in connection with that device means that the device itself is selected/identified/chosen/determined/picked, and/or that a preset associated with the device is selected/identified/chosen/determined/picked.

Figure 1:
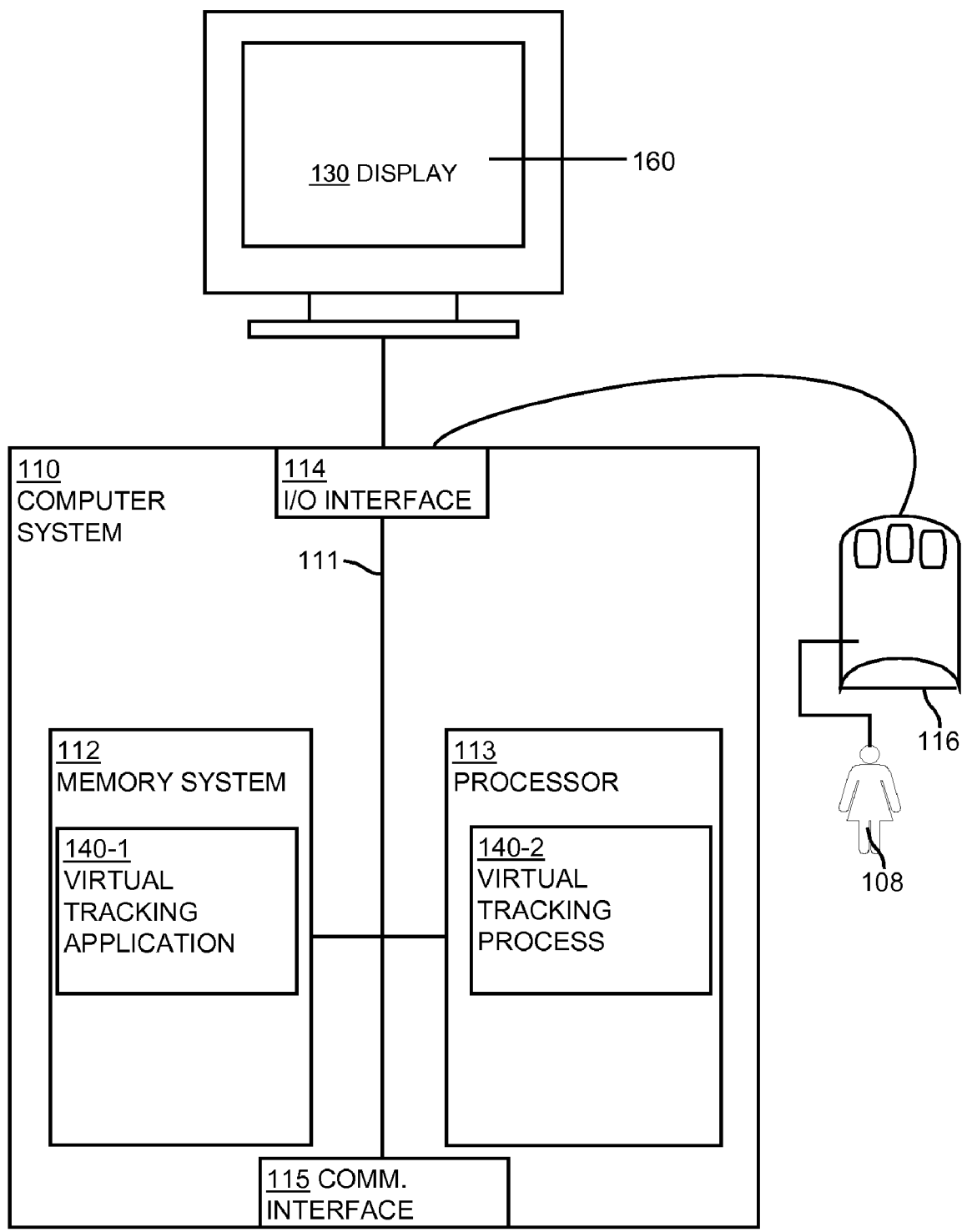
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a virtual tracking application 140-1 and a virtual tracking process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 such as a web page developer to provide input commands and generally control a graphical user interface 160 shown on a display 130. The communications interface 115 enables the computer system 110 to communicate with other devices (e.g., other computers) on a network (not shown in FIG. 1).

The memory system 112 is any type of computer readable medium and in this example is encoded with a virtual tracking application 140-1. The virtual tracking application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the virtual tracking application 140-1. Execution of the virtual tracking application 140-1 in this manner produces processing functionality in a virtual tracking process 140-2. In other words, the virtual tracking process 140-2 represents one or more portions or runtime instances of the virtual tracking application 140-1 performing or executing within or upon the processor 113 in the computer system 110 at runtime.

It is noted that example configurations disclosed herein include the virtual tracking application 140-1 itself including the virtual tracking process 140-2 (i.e., in the form of un-executed or non-performing logic instructions and/or data). The virtual tracking application 140-1 may be stored on a computer readable medium (such as a floppy disk), hard disk, electronic, magnetic, optical or other computer readable medium. The virtual tracking application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the virtual tracking application 140-1 in the processor 113 as the virtual tracking process 140-2. Those skilled in the art will understand that the computer system 110 may include other processes and/or software and hardware components, such as an operating system not shown in this example.

The display 130 need not be coupled directly to computer system 110. For example, the virtual tracking application 140-1 may be executed on a remotely accessible computerized device via the network interface 115. In this instance, the graphical user interface 160 may be displayed locally to a user of the remote computer and execution of the processing herein may be client-server based. In some embodiments, the graphical user interface 160 may be a customer interface through which a user, such as the user 108, is able to learn various information and take various actions. The amount of features, and control thereof, may depend on a user level, such that a basic user has access to only a certain amount of features, while an administrator may have access to all available features. Key features of the graphical user interface 160 may include the ability to locate and activate cameras easily from a searchable directory; the ability to locate and activate cameras easily from a map representation; the ability to control cameras and NVRs to effect Pan-Tilt-Zoom (PTZ), iris, focus, playback, etc.; the ability to list and get details on incoming events; the ability to locate people and use collaboration tools to interact with them; the ability to locate shared folders and reference and active files; the ability to control video walls; the ability to initiate video tours, which are described in detail in co-pending U.S. patent application Ser. No. 12/125,124, entitled "INTELLIGENT VIDEO TOURS", the entirety of which is incorporated herein by reference; and administrative features such as but not limited to create/modify/list/delete users, roles, tours, devices, etc. Further features of embodiments of a graphical user interface 160 are described herein.

Figure 2:
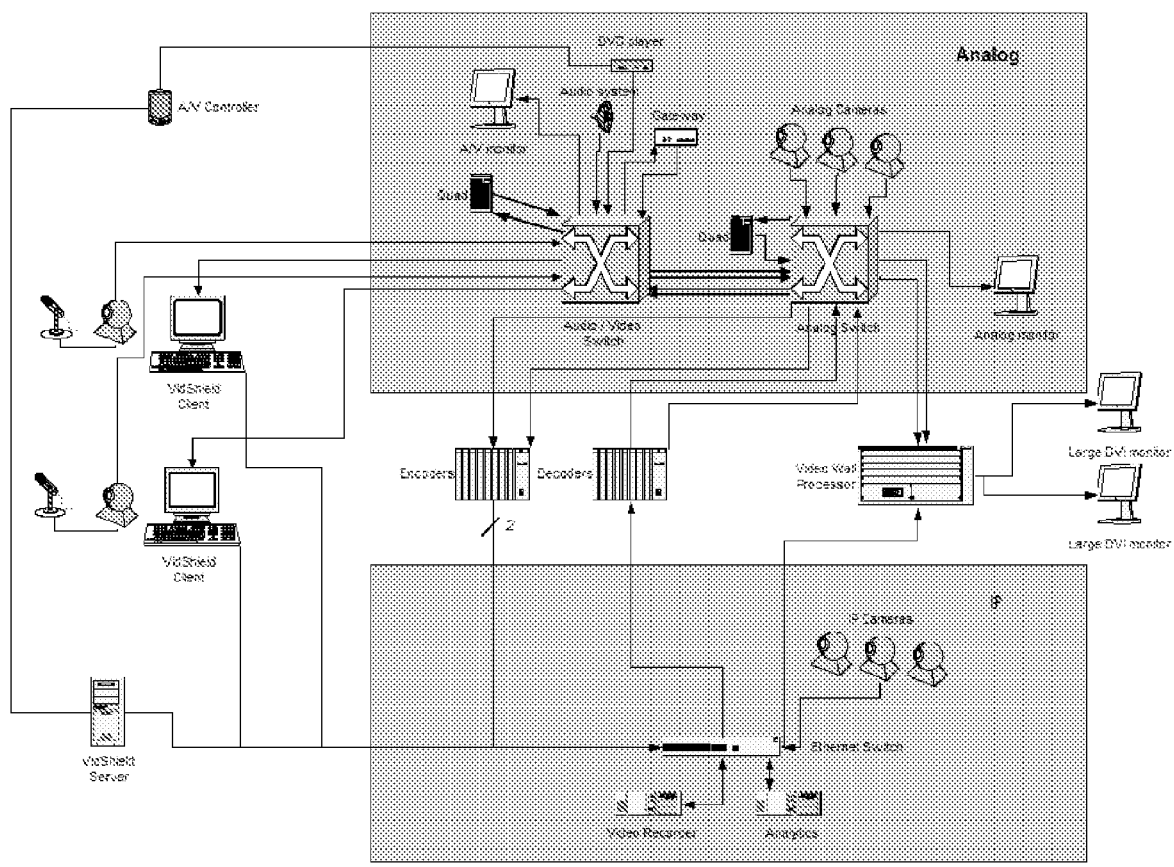
FIG. 2 illustrates an example of a graphical user interfaced provided by a procedure performed by the system of FIG. 1.

FIG. 2 illustrates an example of a graphical user interface that may be created by the virtual tracking process 140-2. FIGS. 3-6 are flowcharts of various embodiments of the virtual tracking process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 3 illustrates an embodiment of the virtual tracking application 140-1 executing as the virtual tracking process 140-2. Note that the virtual tracking process 140-2 may be manually engaged by a user, or, in some embodiments, may be automatically engaged through any combination of external analytics, biometrics, access control, sensor technology, etc., when fed into the event and rules correlating process described in co-pending U.S. patent application Ser. No. 12/125,115, entitled "EVENT CAPTURE, CROSS DEVICE EVENT CORRELATION, AND RESPONSIVE ACTIONS", the entirety of which is hereby incorporated by reference. The user uses the virtual tracking process 140-2 to track a target, as defined above, across a region using a plurality of video devices. A region may be any area of any size, and a video device includes any type of camera but also devices that capture and store video, such as an NVR.

The virtual tracking process 140-2 provides a graphical user interface, step 301, on a display (such as the display 130 shown in FIG. 1) where a user (such as the user 108 shown in FIG. 1) is able to view it. The graphical user interface includes multiple regions, each of which is capable of showing video. In a first region, the graphical user interface display video from a field of view of a main video device. The main video device is that video device having a field of view in which the target being tracked is currently located. In other words, when a user looks at the first region of the graphical user interface, the video shows, or has shown, the target the user is tracking, or wants to track. The video that shows the target comes from a video device that is considered to be the main video device. As is explained below, the designation of a video device by the virtual tracking process 140-2 as the main video device changes over time. In a plurality of second regions, the graphical user interface displays video from a field of view of each of a plurality of perimeter video devices, the field of view of each perimeter video device being proximate to the field of view of the main video device. That is, a perimeter video device has a field of view that is near, close, adjacent to, or otherwise is in some relation to the field of view of the main video device. This allows a user of the virtual tracking process 140-2 to continue to track a target after the target is no longer in the field of view of the main video device.

For example, a user may view video from the main video device, and notice a person acting suspiciously (a target) in the center of a room. The main video device has a field of view that includes the center portion of that room. However, the field of view is of some finite dimensions, such that, if the target is moving towards a door on the right side of the room, the target will eventually move out of the field of view of the main video device. That is, the main video device will no longer "see" (i.e., be able to provide video of) the target. The virtual tracking process 140-2, whether it is already active or is activated by the user at this moment in time, provides, on the graphical user interface, video from some number of perimeter video devices. In an ideal situation, one of those perimeter video devices has a field of view near enough (i.e., proximate to) the field of view of the main video device such that, upon leaving the main video device's field of view, the target enters the field of view of that perimeter video device. In the above example, one of the perimeter video devices selected by the virtual tracking process 140-2 may thus have a field of view that covers the right side of the room, including the door the target is moving towards. Of course, not all situations are ideal, and thus, in some embodiments, the fields of view of the main video device and the perimeter video devices may not line up perfectly. Embodiments of the virtual tracking process 140-2 disclosed herein include a variety of mechanisms to deal with such situations, which are described in greater detail below. The procedure(s) by which the virtual tracking process 140-2 selects perimeter video devices, and their fields of view, is also described in greater detail below.

Note that the number of second regions may be equivalent to the number of available perimeter video devices that fit the proximate criteria, as determined by the virtual tracking process 140-2 using processes described herein. Alternatively, in some embodiments, at some points in time, the graphical user interface may include more second regions than there are available perimeter video devices to provide video for, such that some of the second regions do not display any video for a period of time. Of course, these regions may display video at a later point or points in time.

An example graphical user interface 200 is shown in FIG. 2. In some embodiments, the graphical user interface provided by the virtual tracking process 140-2 is configured such that the first region is located in a central portion of the graphical user interface, and the plurality of second regions are located around the first region. The arrangement of the plurality of second regions may reflect the locations of the perimeter video devices relative to the main video device. That is, a second region displaying video from a perimeter video device with a field of view that is north in relation to the field of view of the main video device may be located above the first region on the graphical user interface. A second region displaying video from a perimeter video device with a field of view that is south in relation to the field of view of the main video device may be located below the first region on the graphical user interface, and so on. Thus, the arrangement of the plurality of second regions may correspond to cardinal directions (N, S, E, W, NE, SE, NW, SW, etc.) in relation to the first region. In some embodiments, each region of the graphical user interface is of the same size. Alternatively, in some embodiments, the first region of the graphical user interface is larger than some, or all, of the plurality of second regions. Thus, in some embodiments, the plurality of second regions may also vary in size, such that some are larger than others. Further, the virtual tracking process 140-2 may, in some embodiments, change the size of one or more regions of the graphical user interface during tracking. This may depend on the resolution of the video, the available space for showing the graphical user interface on the display, or may be changed at the request of the user. Of course, a graphical user interface provided by the virtual tracking process 140-2 may be configured in any number of ways, and may provide any number of commands to a user.

The virtual tracking process 140-2 then receives a selection of one of the plurality of perimeter video devices, step 302. Typically, a user of the virtual tracking process 140-2 makes the selection by providing input to the virtual tracking process 140-2 through an input device (such as the input device 116 shown in FIG. 1). In some embodiments, as the target being tracked moves through the field of view of the main video device, it becomes apparent to the user of the virtual tracking process 140-2 where the target is going. That is, the user is able to guess which perimeter video device has the field of view into which the target will move. The user then selects that perimeter video device. Of course, the user may wait until the target actually enters that field of view, at which point, the user selects that perimeter video device.

In response to receiving the selection, the virtual tracking process 140-2 seamlessly performs three actions. The virtual tracking process 140-2 displays video from a field of view of the selected perimeter video device in the first region, step 303. Thus, the virtual tracking process 140-2 designates the selected perimeter video device as the new main video device. This designation is important, because the virtual tracking process 140-2 uses the location, and size, of the field of view of the selected perimeter video device to perform further actions. The field of view of a video device is an area of the region that the video device covers, that is, is able to take video of. In order to know the field of view of the plurality of video devices, the virtual tracking process 140-2 must have a way to relate those areas with the region in which one or more targets may be tracked.

To do this, the virtual tracking process 140-2 may include a geometry engine, referred to herein as a geo engine. A geo engine is a component of the virtual tracking process 140-2 that is able to, among other things, model a region in which a target may be tracked by using a coordinate system. That is, the virtual tracking process 140-2 (through the geo engine) assigns a coordinate system, for example an x,y coordinate system, to a map of the region. Coordinate systems assigned by the virtual tracking process 140-2 are discussed in greater detail below. In some embodiments, such as described below with regards to FIG. 6, the virtual tracking process 140-2 may need to use one or more different coordinate systems to model more complex regions.

With the region assigned to a coordinate system, the virtual tracking process 140-2 then must also relate the fields of view of the plurality of video devices to the coordinate system as well. The plurality of video devices may be thought of as being of two types: fixed video devices, and movable video devices. That is, some of the plurality of video devices are not able to change their position, and thus are considered fixed. The field of view of a fixed video device thus does not change, and is known upon installation of the video device. The virtual tracking process 140-2, through the geo engine, accesses this information and stores it in a configuration database. The configuration database also includes the coordinate system the virtual tracking process 140-2 assigned to the region that includes the plurality of video devices. Each video device in the plurality has an entry in the configuration database. For fixed video devices, the entry includes the location of the video device, relative to the coordinate system, and the location and size of the field of view of that video device, also relative to the coordinate system. The field of view of a fixed video device always covers the same area on the coordinate system, and may be considered to be a spot on the coordinate system.

Movable video devices are in a static location, but are able to change their positioning such that they may cover a number of spots. That is, a movable video device has more the one possible field of view. Some of these possible fields of view (and thus positions of the device) may be stored within the device as one or more presets. Presets are simply a way to record one or more settings of the device, such as where it is pointing, what the zoom level is, and other such attributes, so that the device may be moved to that position easily. The virtual tracking process 140-2 stores the location of each movable video device in the configuration database, as well as the location of some or of all the fields of view that are stored as presets within the device, and positioning information for each preset as well. The virtual tracking process 140-2 is able to store information regarding fields of view produced by manual positioning of a device (that is, not through use of presets) using various methods described herein. For purposes of the following discussion, it is sufficient to know that the virtual tracking process 140-2 knows the locations of the fields of view on the coordinate system, however the virtual tracking process 140-2 has acquired that information.

The virtual tracking process 140-2 (using the geo engine) then identifies a plurality of candidate perimeter video devices, step 304. Each candidate perimeter video device has a field of view that is proximate to the field of view of the selected perimeter video device. That is, a field of view of a candidate perimeter video device is near, adjacent to, or otherwise in relation to the field of view of the selected perimeter video device. The geo engine of the virtual tracking process 140-2 determines candidates by accessing the location data of the fields of view of the plurality of video devices that is stored in the configuration database. Thus, in some embodiments, the virtual tracking process 140-2 first looks up, in the configuration data, the field of view of the selected perimeter video device, and acquires its spot (e.g., its coordinates in the assigned coordinate system, and its size). The virtual tracking process 140-2 then looks in the configuration database for fields of view that have locations proximate to the spot of the selected perimeter video device, taking into account that some locations may be either too near or to far from the spot to be useful.

In some situations, the virtual tracking process 140-2 may find more proximate fields of view than there are second regions of the graphical user interface to display video in. In such situations, the virtual tracking process 140-2 will use various techniques, such as those described with regards to FIG. 6 below, to parse down a list of candidate perimeter video devices to include only a number of devices equal to the number of second regions available to display video. Alternatively, in other situations, the virtual tracking process 140-2 may find fewer proximate fields of view than there are second regions of the graphical user interface to display video in. Thus, the virtual tracking process 140-2 may display no video in some second regions. In either situation, in some embodiments, the virtual tracking process 140-2 may re-configure the graphical user interface to include more or less second regions, as appropriate. The ultimate goal of the virtual tracking process 140-2, whether there are too many proximate fields of view, or too few (relative to the number of second regions), is to determine which are the "best", that is, most likely to show video of the target being tracked after the target exits the field of view of the current main video device.

For regions that are outside or otherwise of a large scale, the virtual tracking process 140-2 may use GIS (latitude/longitude) coordinates when assigning a coordinate system to such a region, and correlating spots of fields of view with the coordinate system. GIS coordinates, however, are generally not practical for use for regions that are inside, such as a region inside a building. Thus, the geo engine supports the use of non-GIS coordinates to specify locations. In such situations, the virtual tracking process 140-2/geo engine will create a coordinate system relative to the building or other internal structure. The virtual tracking process 140-2 may use whatever units and geographical origin makes sense for such situations. For example, in a relative coordinate system, the virtual tracking process 140-2 may set the origin (x=0,y=0) as a specific corner of a building, or perhaps the center of the building. Alternatively, the virtual tracking process 140-2 may set the origin as a point outside of the structure, such as at a flag pole or other landmark. The virtual tracking process 140-2 may specify units in any way, such as but not limited to, feet, inches, meters, or even the number of ceiling or floor tiles. In those situations, the virtual tracking process 140-2/geo engine receive a mapping of specified units to a natural distance (i.e. feet/inches) so the virtual tracking process 140-2 knows how to calculate what is proximate to a field of view of a main video device.

In some embodiments, the virtual tracking process 140-2/geo engine may use the coordinates of the target (via the spot of the current main video device, who's video shows the target) in conjunction with the coordinates of the spots of the other video devices to geometrically determine which spots are proximate (i.e., near) the target, and how the various spots relate to each other. The virtual tracking process 140-2 may determine which set of spots (and thus, the candidate perimeter video devices) provides the best coverage of the area surrounding the target's location by calculating the area of the spots, the distance of each spot from each other, and the distance of each spot from the spot of the main video device, as well as any overlap or holes in coverage of a set of candidate spots.

In some embodiments, the virtual tracking process 140-2 may use the physical layout and current occupancy of a building to influence which perimeter video devices the virtual tracking process 140-2 selects as candidate perimeter video devices. Typically, the geo engine presumes that a target has an equal probability of moving in any direction. However, a target being pursued, or one that is attempting to hide, may seek out things to hide behind or within. The virtual tracking process 140-2 may thus include the coordinates of physical barriers to visibility (e.g., poles, walls) that represent potential blind spots in coverage by the video devices. Such blind spot may be obvious to the target. By including the coordinates of the barriers, the virtual tracking process 140-2 may be able to use that information to predict where a target may attempt to hide or become lost. For example, the area behind a pole may be covered by a video device, but that device may not be a very good candidate. The virtual tracking process 140-2, through the geo engine, may determine that while it has the area covered very well from a general point of view, it has a vulnerability (i.e., a hole in coverage) that has a higher probability of a suspect attempting to leverage—that is, the space behind the poll. Thus, the virtual tracking process 140-2 may associate some spots with different priorities, which may cause the video devices creating those spots to be selected when they otherwise might not.

In some embodiments, for example, a suspect may attempt to hide in a crowd. A crowd may be represented as an area of higher probability that a target may go to, again hinting to the virtual tracking process 140-2 that this area should have better coverage with the candidate spots than areas that have no crowds. The virtual tracking process 140-2 may determine crowds statically or dynamically. In the static situation, the virtual tracking process 140-2 uses known past behaviors and enters that data into the configuration database. Static crowds may be influenced by time of day. So for example, the area where a performer does an act at certain time of the day in a casino may be programmed into the virtual tracking process 140-2 as expecting a crowed to be there at 15 minutes past the hour, for 10 minutes between the hours of 1 pm to 7 pm, and otherwise to have nominal traffic. The virtual tracking process 140-2 may also use video analytics to determine dynamic crowd patterns. That is, for example, the virtual tracking process 140-2 may use video analytics, or other analytics, and analysis to acquire current crowd data in the geo engine. This data may be updated in near real time as crowds form and move about.

Finally, however the candidate perimeter video devices are determined, and then appropriately parsed down, if necessary, the virtual tracking process 140-2 repopulates the plurality of second regions with video from a field of view of each of the plurality of identified candidate perimeter video devices, step 305. That is, with the graphical user interface showing video from the selected perimeter video device in the first region, the plurality of second regions must show different video as well, from the new plurality of perimeter video devices. The virtual tracking process 140-2 thus fills the second regions of the graphical user interface with video from the new plurality of perimeter video devices. Note that, in some embodiments, the virtual tracking process 140-2 may display video from a perimeter video device both prior to the virtual tracking process 140-2 receiving the selection of a perimeter video device, and after the virtual tracking process 140-2 repopulates the second regions. That is, one or more perimeter video devices may remain the same, even though the video device the virtual tracking process 140-2 designates at the main video device changes. This will, of course, depend on how the virtual tracking process 140-2 identifies candidate perimeter video devices, and may, in some embodiments, also depend on how the virtual tracking process 140-2 selects from among candidate perimeter video devices, procedures for both of which are described herein.

Typically, the virtual tracking process 140-2 repeats the steps of receiving, displaying, identifying, and repopulating as frequently as needed during tracking of a target. This occurs as a user tracks a target across a region. Thus, every time a target leaves the field of view of the current main video device, a user will select one of the perimeter video devices, and the virtual tracking process 140-2 will find new perimeter video devices, and so on, until the target is either not being tracked, or is lost, or goes beyond the region in which the virtual tracking process 140-2 is able to provide video of the target. For example, as a target moves through, say, an airport, a user may need to select a perimeter video device a hundred times, and thus the virtual tracking process 140-2 will perform steps 302, 303, 304, and 305 a hundred times.

In some embodiments, the virtual tracking process 140-2 provides functionality that allows a user to see an approximation of a path that a target being tracked is taking through an area or region. That is, the virtual tracking process 140-2 first displays a map of the region on the graphical user interface, step 306. A location of each of the plurality of video devices is identified on the map. Thus, the map shows where each video device is located: on the wall of a room, on the ceiling in another room, mounted in the floor in the hallway, and so on. The virtual tracking process 140-2 then places a line on the map, the line connecting video devices according to a sequence, the sequence corresponding to selection of video devices, the line identifying a path of the target being tracked, step 307. In other words, as a target moves through a region, a user tracks the target using the virtual tracking process 140-2 by selecting a new main video device each time the target leaves (or is going to leave) the field of view of the current main video device. The order in which the user selected video devices—i.e., the sequence—tells the virtual tracking process 140-2 where to draw the line. That is, if a target walked through a room such that the user selected video device A first, and then video device C, and then video device F, and so on, the virtual tracking process 140-2 is able to display a line connecting the position of video device A to the position of video device C, the position of video device C to the position of video device F, and so on.

In some embodiments, the virtual tracking process 140-2 may use the location of known physical barriers (e.g., walls, rails, etc.) to predict a target's path. For example, the virtual tracking process 140-2 may represent such barriers in the coordinate system assigned to a region, as objects that a target is not able, or likely, to go through. The geo engine would then take this data into account when identifying candidate perimeter video devices. For example, given locations that represent physical barriers, the geo engine knows that a target moving towards, for example, a wall, must go either left, right, or back in the direction they came from when they get to the wall. The virtual tracking process 140-2 may model this, for example, as an obstruction that prevents passage (i.e., modeling the building as not a flat open space but as a series of walls, with entry/door ways marked). The virtual tracking process 140-2 would not consider video devices that are on opposite sides of a (sufficiently long) wall to be candidates. Further, the virtual tracking process 140-2 would treat the video devices to the left and right, in this example, as strong candidates for a suspect moving towards a wall, as they represent the highest probability paths. The virtual tracking process 140-2 may treat rails and curtains similarly to walls, except that it is possible to jump over, duck under, or otherwise go around a curtain (and a rail, in some situations). In such cases, the virtual tracking process 140-2 would assign stronger priorities to video devices to the left/right, but would also include the devices on the other side at a lower priority. The virtual tracking process 140-2 would get a hint from the physical topology layout as represented in the configuration database, along with an indicator of 'passability'. Thus, in this case, a passability of one might represent an open space (i.e., open to passage), whereas a wall would represent a passability of 0 (i.e., not passable), and a curtain or low barrier might be a passability of 0.25.

Further, in some embodiments, the virtual tracking process 140-2 may use past behavior of a target (as evidenced by locations of video devices with spots in which the target was in) to influence the selection of candidate video devices by the geo engine. For example, the geo engine may be provided the location of the previous few spots that the target was in. The geo engine would calculate the center of those spots, and through simple geometry, calculate the direction of travel. For example, if previous spots had the same 'y' coordinate, but an increasing 'x" coordinate, it's clear that the target is heading to the left or right, depending on orientation. That information may influence the geo engine to select more candidates in that direction, or to select candidates that cover areas a bit further in that direction, so as to try to stay ahead of the target. When selecting candidates, it is often the case that there are more video devices that could be selected than may be reasonably shown in the plurality of second regions. By using the previous direction of motion of a target, the virtual tracking process 140-2 may select candidates that cover the higher probability areas better or deeper than the lower probability areas.

Note that, in some embodiments, the virtual tracking process 140-2 may use a marker (e.g., an arrow), or a sequence of markers (e.g., a number of arrows connected point to tail), or any other graphical indicator of direction, to display the approximate path instead of a line. Further, in some embodiments, the virtual tracking process 140-2 may include analytic functionality that allows the virtual tracking process 140-2 to project one or more likely future paths from the existing path. For example, the virtual tracking process 140-2 may analyze a path of a target, such that when viewing the path, the virtual tracking process 140-2 is able to determine that the target is likely moving towards an exit door located on the far left side of the room. The virtual tracking process 140-2 may indicate the projected path to a user on the map by showing, for example, a dotted line or other marker, different from the marker of the known path, from the location of the current main video device (i.e., the target's approximate current location) to that door. Of course, as described herein, the virtual tracking process 140-2 may also utilize other analytic data, such as a stride of the target, or the target passing a number of sensors, etc., to project one or more likely paths. In some embodiments, the virtual tracking process 140-2 may also store the view of the path on the map, including one or more projected paths, for use at a later time.

In some embodiments, instead of receiving a selection of a perimeter video device, the virtual tracking process 140-2 selects one of the plurality of perimeter video devices automatically through use of analytics, step 308. That is, one or more external automated stimuli may be used to drive the virtual tracking process 140-2. Such stimuli may include, but are not limited to, GPS positional information, RFID positional information, sensor data, and so on. For example, the virtual tracking process 140-2 could use RFID positional information by receiving the information from one or more sensors, comparing that data with a map of the region and all video devices and their field(s) of view, and then using the data to pick the video devices with the fields of view nearest to the target for use as the main video device and the plurality of perimeter video devices. Of course, the virtual tracking process 140-2 may use any techniques described herein to either further narrow down video devices that the virtual tracking process 140-2 may select from, after using the analytic data, or to initially narrow down video devices that the virtual tracking process 140-2 may select from, prior to using the analytic data.

In FIG. 4, the virtual tracking process 140-2 allows a user to track a target backwards in time, and to also track one or more other targets forwards (or backwards) in time. The virtual tracking process 140-2 first provides a graphical user interface, step 401, wherein the graphical user interface displays, in a first region, video from a field of view of a main video device, and, in a plurality of second regions, video from a field of view of each of a plurality of perimeter video devices, the field of view of each perimeter video device being proximate to the field of view of the main video device. The virtual tracking process 140-2 then receives a selection of one of the plurality of perimeter video devices, step 402, and in response, displays video from a field of view of the selected perimeter video device in the first region, step 403; identifies a plurality of candidate perimeter video devices, each candidate perimeter video device having a field of view that is proximate to the field of view of the selected perimeter video device, step 404; and repopulates the plurality of second regions with video from a field of view of each of the plurality of identified candidate perimeter video devices, step 405, as described herein.

The plurality of video devices that the virtual tracking process 140-2 uses are, in some embodiments, always on, such that even if the virtual tracking process 140-2 does not need or use one or more of those devices, the devices operate to gather video. Thus, the virtual tracking process 140-2 is able to record, for some period of time, video from a subset of the plurality of video devices, step 406. The virtual tracking process 140-2 may make use of NVRs (network video recorders) to perform the act of recording. Using NVRs allows the virtual tracking process 140-2 to take advantage of their built-in functionality. That is, the virtual tracking process 140-2 is able to pause video, fast forward, rewind, playback in slow motion, playback frame-by-frame, and so on. In some embodiments, the virtual tracking process 140-2 plays a subset of the recorded video backwards in the graphical user interface to track a target back through a period of time by repeating the steps of receiving, displaying, identifying, and repopulating, the subset of the recorded video used throughout the repeated steps, step 407. The virtual tracking process 140-2 is able to start such playback from a live location (i.e., current video that is being recorded), or from a point in the past, from already recorded video. In some embodiments, a user engages the playback functionality by indicating a video device, or a preset of a video device, to the virtual tracking process 140-2, and the virtual tracking process 140-2 will begin playback by using the video from that indicated device/preset.

As the virtual tracking process 140-2 plays the video backwards in the graphical user interface, the virtual tracking process 140-2 displays the video in the first region of the graphical user interface, and treats the device that gathered that video as the main video device. Simultaneously, the virtual tracking process 140-2 identifies perimeter video devices with fields of view proximate to the field of view of the main video device, and acquires the video recorded from those perimeter video devices for display in the plurality of second regions of the graphical user interface. The virtual tracking process 140-2 may use any methodology described herein to identify appropriate perimeter video devices. Of course, the virtual tracking process 140-2 synchronizes the video from the perimeter video devices with the video displayed in the first region. As the virtual tracking process 140-2 advances the video displayed in the first region back in time, at some point, the target of interest will have exited that device's field of view and thus should appear in the video of one of the perimeter video devices. The user is then able to select this perimeter video device, so that the virtual tracking process 140-2 designates it as the main video device, and the process continues (i.e., the virtual tracking process 140-2 finds new appropriate perimeter video devices, and acquires and displays their recorded video). At any time, the virtual tracking process 140-2 may make use of time coordinates, video device coordinates, and/or direction of the target, to assist in identifying perimeter video devices.

Thus, for example, if a user of the virtual tracking process 140-2 first sees a target (e.g., a person who looks to have a bulge under their jacket, similar to the shape of a gun) on a current video from a current main video device, the user is able to go backwards in time on the recorded video, as described above, to see where that target has been, and, for example, who, if anyone, the target may have interacted with. Say the target spoke with another person on the other side of the room ten minutes prior to the user first having seen the target. The user may then consider the other person as a second target, and may desire to follow that person back in time. The virtual tracking process 140-2 allows a user to do this by repeating the above steps for the second target. As long as there is recorded video of a target, the virtual tracking process 140-2 is able to go as far back in time, for as many different targets, as a user desires.

The virtual tracking process 140-2 also allows a user to follow, for example, the second target in the above example, forward in time. To do this, the virtual tracking process 140-2 first ceases backwards playback of the subset of the recorded video at a point, step 408. A point is simply a location in the video, either in time or in image, at which the user stops backwards playback. The user would then instruct the virtual tracking process 140-2 to play a subset of the recorded video forward from the point to track a second target, step 409. The virtual tracking process 140-2 allows the user to track the second target by repeating the steps of receiving, displaying, identifying, and repopulating, the subset of the recorded video used throughout the repeated steps. Continuing the example used above, a user of the virtual tracking process 140-2 could follow the second target forward in time from his meeting with the first target (i.e., the person with the coat bulge that looked like a gun). The virtual tracking process 140-2 would play recorded video including the second target in the first region of the graphical user interface, and would determine perimeter video devices from which to acquire recorded video to populate the second regions of the graphical user interface. As the second target moved around the region, the user would follow the usual steps. That is, the user would select a perimeter video device for the virtual tracking process 140-2 to designate as the main video device, at which point, the virtual tracking process 140-2 would identify new perimeter video devices, and show their recorded video in the second regions, and so on. Backwards and forwards tracking through the virtual tracking process 140-2 could be done in any number of combinations; that is, the second target might lead to a third target, who was tracked forward in time; the third target might lead to a fourth target, who was tracked backwards in time to a fifth target, and so on.

Note that different NVRs behave differently in terms of some playback operations. For example, different types of NVRs (i.e., NVRs produced by different vendors) seldom perform a fast forward operation, or a fast rewind operation, for example, at exactly the same speed. To facilitate keeping different types of NVRs synchronized, drivers for NVRs keep track of the intentions of the selected video device and pass that to the drivers for other candidate video devices. For example, in some NVRs, stepping back one frame backs up video one second, approximately thirty frames. Thus, a driver would need to keep track of this with thirty back one frame clicks, and instead of going back 30 seconds, would ignore twenty-nine of the back one frame clicks and honor only the thirtieth. For fast forward and/or rewind over fairly short periods of time, a simple resynchronization would be sufficient. That is, when an NVR stopped fast forwarding, the virtual tracking process 140-2 would note the time and cause other NVRs to move their video to that time. For longer fast forwards/rewinds, the operation would be paused from time to time, and the above process would be repeated at those points, before the operation resumed again.

FIG. 5 illustrates embodiments of the virtual tracking process 140-2 causing video devices to change position when being used by the virtual tracking process 140-2, and then resume a previous or default position when they are no longer used by the virtual tracking process 140-2. Prior to displaying video from a field of view of a video device, the virtual tracking process 140-2 identifies a plurality of fields of view associated with that video device, each field of view associated with a position of the video device, step 506. Thus, the virtual tracking process 140-2 may take this action before any video is displayed, for example, in the graphical user interface just after the virtual tracking process 140-2 provides the graphical user interface for the first time. Alternative, the virtual tracking process 140-2 may take this action at any point during the tracking process before it displays video from a video device (e.g., before video from a perimeter video device is shown in one of the second regions of the graphical user interface). The position of the video device may be determined, for example, by intercepting one or more commands send to the device. A command may be a PTZ-type command, where the video device is told to move to a certain pan position, a certain tilt position, a certain zoom, or some combination thereof. Alternatively, a command may be for the device to execute a preset setting, such that the device positions itself to an already set PTZ position that is associated with that preset. The preset positions of each video device may be stored, in some embodiments, in a configuration database. This data may be accessed at any time. The configuration database also includes information that describes the field of view of the device for each of its preset positions, and may include the field of view (or ways to determine the field of view) for non-preset positions. The virtual tracking process 140-2 may use a number of different ways to determine the position, and thus field of view, of a device. For example, the virtual tracking process 140-2 may have access to a compass reporting function internal to each video device. The compass reporting function tells the virtual tracking process 140-2 the compass heading of the device, and may also tell the virtual tracking process 140-2 the zoom setting of the device. The virtual tracking process 140-2 may then use this information to determine where the device's field of view is, and how large the field is as well. Alternatively, some video devices are capable of reporting their current position and/or zoom. Thus, this information may, in some embodiments, be directly input from a device into the virtual tracking process 140-2. In some embodiments, the virtual tracking process 140-2 may use the reported current zoom and current focus distance of a video device to determine not only where the device is pointing, but how far away it points as well.

The virtual tracking process 140-2 then selects a field of view of the video device that is optimally proximate to the field of view of the main video device, step 507, using any techniques described herein. Finally, the virtual tracking process 140-2 directs the video device to move to the position associated with the selected field of view, step 508. In some embodiments, the virtual tracking process 140-2 may use an internal compass of a video device to direct the device to the appropriate position, as well as the appropriate zoom setting. For such devices, the virtual tracking process 140-2 may calculate specific coordinates to point the device to, using standard geometry. The virtual tracking process 140-2 would then direct the device to position itself so as to cover those coordinates, and adjust its zoom according to the distance of those coordinates from the device. The zoom setting the virtual tracking process 140-2 sends to the device may, in some embodiments, be influenced by candidate perimeter video devices. That is, if a device is near other candidate devices, the virtual tracking process 140-2 may select a zoom for that device to fill in spaces between itself and the other candidate devices. Alternatively, if there were no other nearby candidates, the virtual tracking process 140-2 may select a wider angle zoom to cover as much space as possible. Additionally, in some embodiments, the virtual tracking process 140-2 may calculate the expansion/contraction of a field of view based on the zoom increase/decrease.

With one or more video devices appropriately positioned the virtual tracking process 140-2 then performs the procedure as described above. That is, the virtual tracking process 140-2 provides a graphical user interface, step 501, wherein the graphical user interface displays, in a first region, video from a field of view of a main video device, and, in a plurality of second regions, video from a field of view of each of a plurality of perimeter video devices, the field of view of each perimeter video device being proximate to the field of view of the main video device. The virtual tracking process 140-2 then receives a selection of one of the plurality of perimeter video devices, step 502, and in response, displays video from a field of view of the selected perimeter video device in the first region, step 503; identifies a plurality of candidate perimeter video devices, each candidate perimeter video device having a field of view that is proximate to the field of view of the selected perimeter video device, step 504; and repopulates the plurality of second regions with video from a field of view of each of the plurality of identified candidate perimeter video devices, step 505, as described herein. Of course, the virtual tracking process 140-2 may repeat the positioning process while identifying candidate perimeter video devices, and then displaying the video from candidate perimeter video devices.

When the virtual tracking process 140-2 is done with a video device, that is, the virtual tracking process 140-2 no longer displays any video from that video device, and the virtual tracking process 140-2 has previously positioned the video device, in some embodiments, it is preferable to reposition the video device back to its original position. For example, a video device may have been placed in a particular position for a reason. While the virtual tracking process 140-2 may be allowed to use that video device temporarily, the reason for its original positioning is not fulfilled if the device is out of that original position. Thus, in some embodiments, the virtual tracking process 140-2 records an initial position of the video device, step 509. This would, of course, occur prior to the virtual tracking process 140-2 changing the position of the video device as described above. Then, upon the virtual tracking process 140-2 no longer displaying video from that video device in the graphical user interface, the virtual tracking process 140-2 directs the video device to return to the initial position, step 510. Of course, in some embodiments, such as those described above with regards to FIG. 4, the virtual tracking process 140-2 may display recorded video from that video device in the graphical user interface. However, such situations do not count towards the virtual tracking process 140-2 keeping the device out of its original position, and thus do not affect the virtual tracking process 140-2 returning that device to its original position.

In some embodiments, the virtual tracking process 140-2 may track the state of a video device, including tracking the state of its presets, to identify a current position and previous positions of the device. The virtual tracking process 140-2 may do this tracking by intercepting and recording preset commands as they are sent to the device. The virtual tracking process 140-2 is then able to direct the device to return to its initial position by going back to the recorded original preset position. Alternatively, the virtual tracking process 140-2 may store the initial or current position of a video device in an unused or specially designated preset of the device. Then, to direct the device to return to that position, the virtual tracking process 140-2 simply needs to command the device to move to the position defined by the otherwise unused preset.

In FIG. 6, the virtual tracking process 140-2 uses location data, include lists, and exclude lists, to determine which video devices should, or should not, be candidates for perimeter video devices. First, the virtual tracking process 140-2 provides a graphical user interface, step 601. The graphical user interface displays, in a first region, video from a field of view of a main video device, and, in a plurality of second regions, video from a field of view of each of a plurality of perimeter video devices, the field of view of each perimeter video device being proximate to the field of view of the main video device, as described herein. The virtual tracking process 140-2 then receives a selection of one of the plurality of perimeter video devices, step 602, and in response, displays video from a field of view of the selected perimeter video device in the first region, step 603. The virtual tracking process 140-2 also, in response, identifies plurality of candidate perimeter video devices, each candidate perimeter video device having a field of view that is proximate to the field of view of the selected perimeter video device, step 604.

In some embodiments, the virtual tracking process 140-2 makes use of location data to identify candidate perimeter video devices. That is, the virtual tracking process 140-2 identifies a plurality of candidate perimeter video devices, each candidate perimeter video device having a location in a coordinate space indicating its distance from the selected perimeter video device, step 606, as described above in greater detail with regards to FIG. 4. The virtual tracking process 140-2 then uses the locations to discard one or more candidate perimeter video devices from the plurality of candidate perimeter video devices, step 607. For example, if the virtual tracking process 140-2 identifies thirty candidate perimeter video devices, and there are only twelve second regions in which to display video, the virtual tracking process 140-2 may discard those devices that are farthest away from the field of view of the main video device. Of course, if the only candidate perimeter video device, for example, to the left of the field of view of the current main device is twenty feet away, the virtual tracking process 140-2 may choose not to discard that device despite its great distance. Additionally, or alternatively, the virtual tracking process 140-2 may discard those devices that have fields of view that overlap with fields of view of other devices. In all situations, the virtual tracking process 140-2 is looking for the best fields of view—that is, those that are not too close, not too far away, not too narrow (i.e., not too small) and/or not too wide angle, as the situation may require—and that do not overlap with other fields of view and that may provide video of a target being tracked.

In some embodiments, the virtual tracking process 140-2 supplements an x,y coordinate space by including a z component to model complex geometries. The z component may, for example, allow the virtual tracking process 140-2 to differentiate between floors in a building, different buildings, and the like. The z components thus allows the virtual tracking process 140-2 to separate coordinate systems from each other, so that, even within the same building, or on the same floor, a coordinate system may be repeated, with the x,y coordinate space being reused, for example, for different rooms on the same floor, different floors of the same building, different logical sections of the same area, and so on. The z component may thus be considered to represent a layer of a region, where the virtual tracking process 140-2 may stack layers on top of each other, or next to each other, as needed.

In some embodiments, how the virtual tracking process 140-2 models spots may be helpful in determining which candidate perimeter video devices to discard. For example, the virtual tracking process 140-2 may model spots as rectangles, by including length, width, and center (or corner) of the spot, or may use full coordinates in the coordinate system (i.e. x, y and x1, y1). Alternatively, the virtual tracking process 140-2 may model spots as ovals or as multisided polygons. The virtual tracking process 140-2 may then model the orientation of a spot to specify the rotation of the rectangle/oval/polygon. In some embodiments, the virtual tracking process 140-2 may model a spot as either the intersection of, or the combination of, an oval and a rectangle. That is, the virtual tracking process 140-2 considers the spot to cover only those areas that are within both the rectangle and the oval. Alternatively, the virtual tracking process 140-2 may consider the spot to cover only those areas that are within either the rectangle or the oval. Note that, in all these embodiments, an oval and a rectangle do not have to have the same center position, length/width, or rotation. Further note that a center position of a spot, be it a rectangle, an oval, or a combination thereof, does not have to actually reflect the true center position of where a video device points. For example, if a video device pointed at the edge of a truly inaccessible area, such as a high cliff, the virtual tracking process 140-2 may model the spot of that device as only covering the actual portion of the field of view that was accessible (i.e., not the air over the edge of the cliff). Such a "false" spot might be a better model for the geo engine, as it would allow for a more finely tuned location of the field of view of the main video device, which in turn would give more accurate information to the geo engine on that view, so that it could potentially return a better list of candidate cameras.

The virtual tracking process 140-2 also allows for the possibility of include lists and exclude lists attached to one or more video devices (or spots (i.e., presets)) to assist in compiling a list of candidate perimeter video devices. That is, in some embodiments, the virtual tracking process 140-2 identifies a plurality of candidate perimeter video devices, wherein at least one candidate perimeter video device has an include list, the include list comprising one or more video devices associated with the candidate perimeter video device, any video device on the include list automatically added to the plurality of candidate perimeter video devices, step 607. An include list is thus just what its name implies; a video device on the include list is included as, at least, a candidate perimeter video device. Note that, in some embodiments, an include list may be associated with a preset position of a video device, such that a single video device (with multiple preset positions) may have multiple include lists associated with it.

Include lists may have a variety of uses to the virtual tracking process 140-2. For example, an include list may be used to bridge different coordinate systems together. For example, video devices in a first coordinate system may be separated from video devices in a second coordinate system by devices that participate in one of those coordinate systems, as well as an include list. Thus, in a hall or walkway between two buildings, A and B, a device at the end of the hall nearest an exit into the hall from the A building would have coordinates of x,y,A. Similarly, a device at the end of the hall nearest an exit into the hall from the B building would have coordinates of x,y,B. The device nearest the A building exit would include the device nearest the B building exit in its include list, and vice versa. The virtual tracking process 140-2 would allow a user to track a target through the A building using, among other things, a coordinate system particular to the A building coordinate system. As the target approached the A building exit, such that the device nearest it was the main video device, the candidate perimeter video device list would automatically include the device nearest the B building exit at the end of the hall. As the target crossed the hall to the B building exit (which, from the point of view of the target, would be an entrance to the B building), the virtual tracking process 140-2 would designate the device nearest the B building "exit" as the main video device. The candidate perimeter video device list would automatically include the device nearest the A building exit. The virtual tracking process 140-2 would then, as the target entered the B building and moved throughout it, determine further candidate perimeter video devices based on the coordinate system particular to the B building. Thus, an include list may allow the virtual tracking process 140-2 to supersede different coordinate systems.

As stated above, the virtual tracking process 140-2 may also allow for exclude lists. That is, the virtual tracking process 140-2 may identify a plurality of candidate perimeter video devices, wherein at least one candidate perimeter video device has an exclude list, the exclude list comprising one or more video devices associated with the candidate perimeter video device, any video device on the exclude list automatically disqualified from being part of the plurality of candidate perimeter video devices, step 608. An exclude list is the opposite of an include list; that is, an exclude tells the virtual tracking process 140-2 to ignore certain video devices. For example, an exclude list may be used to make sure that a sensitive area is always under surveillance from one or more video devices. That is, even though a target may be passing by, for example, a vault, if video devices nearest the vault are on an exclude list associated with a nearby video device that becomes a candidate perimeter video device, the virtual tracking process 140-2 will not consider those vault-nearest devices as candidate perimeter video devices. An exclude list may thus override considerations based on location, proximity of fields of view, and so on. An exclude list, as well as an include list, may be device-specific, or may be global (i.e., associated with all devices). Further, in some embodiments, one or more exclude lists may be used, for example, to model walls. For example, in some situations, video devices that are in the same coordinate system according to the virtual tracking process 140-2 may be near each other in terms of distance, but may be on opposite sides of a wall. Each such device may have an exclude list such that all otherwise nearby devices that are located on the other side of the wall are on the exclude list. Of course, if a device is on the other side of a wall, despite its field of view being proximate to that of a main video device or a candidate perimeter video device, the virtual tracking process 140-2 will not want to use such a device, because the video it provides cannot possibly show the target until the target is no longer blocked by the wall. Further, note that, in some embodiments, an exclude list (similar to an include list) may be associated with a preset position of a video device, such that a single video device (with multiple preset positions) may have multiple exclude lists associated with it.

The virtual tracking process 140-2 may, in some embodiments, apply weights or hints to one or more include lists, exclude lists, or both. For example, if a video device on an include list had as associated weight of ten, this would be a hint (i.e., suggestion) to the virtual tracking process 140-2 to include this video device as a candidate, or as a perimeter video device, over another video device on the include list having an associated weight of two. The virtual tracking process 140-2 may use weights and/or hints for a variety of reasons, such as to encourage the virtual tracking process 140-2 to select of a specific video device near a critical resource (e.g., an object of value, an exit, etc.), and/or to discourage the virtual tracking process 140-2 from selecting a specific video device in an unlikely location (e.g., in a closed corner of a room). Similarly, in some embodiments, the virtual tracking process 140-2 may assign priorities, of a general or specific nature, to video devices. That is, the virtual tracking process 140-2 may mark video devices as being able to be used, and others as should not be used (unless absolutely necessary). Priorities may vary from set levels, such as "never use", "use in case of emergency only", "use any time", etc. The virtual tracking process 140-2 would then take such priorities into account when determining candidate perimeter video devices, or in selecting between candidate perimeter video devices.

Additionally, or alternatively, in some embodiments, the virtual tracking process 140-2 may group video devices, in terms of making location-based calculations but also, or alternatively, in include lists and exclude lists. That is, video devices with similar fields of view (i.e., 'spots') may essentially be picked mutually exclusively. For example, if an include list had two video devices that were positioned similarly, a hint may suggest to the virtual tracking process 140-2 to pick only one of the two, and if that device was busy or otherwise unavailable or unusable, the virtual tracking process 140-2 would select the other device in the grouping.

Further, in some embodiments, the virtual tracking process 140-2 may use multiple algorithms in concert to determine the "best" (i.e., optimal) video devices. For example, the virtual tracking process 140-2 may use a prioritized include list, an exclude list, and a geo-algorithm (i.e., location-based data). All together, the virtual tracking process 140-2 may use multiple techniques to map simple coordinate systems, to bridge separate coordinate systems, and to model soft and hard barriers, such as but not limited to, walls, stairwells, corridors, elevators, and the like. Note that the inclusion and exclusion of specific video devices may affect location-based candidate perimeter video devices. Thus, in some embodiments, the virtual tracking process 140-2 process an include list before it performs location-based calculations, while the virtual tracking process 140-2 processes an exclude list prior to taking any other actions.

Finally, however the virtual tracking process 140-2 has identified perimeter video devices, the virtual tracking process 140-2 repopulates the plurality of second regions with video from a field of view of each of the plurality of identified candidate perimeter video devices, step 605.

In some embodiments, the virtual tracking process 140-2 may include any number of additional features. For example, the virtual tracking process 140-2 may record a history log for storage and later use. Thus, in some embodiments, as a user selects a perimeter video device, the virtual tracking process 140-2 may record an identifier of the selected perimeter video device, as well as its preset position or other positional information, and perhaps also a start time, i.e., a time at which the user selected the video device. As a user selects one or more successive perimeter video devices, or upon ceasing execution of the virtual tracking process 140-2, the virtual tracking process 140-2 records the difference between the start time of that device and the start time of the previous device as a duration. The series of video devices, including start times and durations, may be used by embodiments disclosed in U.S. patent application Ser. No. 12/124,124, cited above. A tour taken from data recorded by the virtual tracking process 140-2 may differ from tours disclosed therein on two counts. First, a tour from data recorded by the virtual tracking process 140-2 may include a start time, so that playback may be done from a NVR or other recording device. Second, a tour from data recorded by the virtual tracking process 140-2 may optionally be run through the virtual tracking process 140-2. That is, not only is a user touring through the selected video devices, but the user is also shown, simultaneously, video from each plurality of perimeter video devices as well, played back from NVRs connected to those devices.

In some embodiments, the virtual tracking process 140-2 may include modeling a non-coordinate area between coordinate areas, either to bridge such areas or for areas of lower density of video devices, so as to improve the ability of the virtual tracking process 140-2 to manage and/or define selection of video devices as perimeter video devices. Further, the virtual tracking process 140-2 may use such a non-coordinate and/or mixed coordinate system to model video devices that connect distinct buildings, different floors within a building, stairwells, external corridors, and the like. The virtual tracking process 140-2 may also, in some embodiments, use such a non-coordinate and/or mixed coordinate system to model video devices to deal with elevators.

Elevators represent a special problem to tracking position, because an elevator is a location that moves. An elevator has a fixed x,y position, and a variable z position. There are a number of ways to deal with this situation. For example, the virtual tracking process 140-2 may receive feedback from the elevator control via a communication path, which would tell the virtual tracking process 140-2 what floor the elevator is at both when it is stopped and while it is moving. Alternatively, the virtual tracking process 140-2 may use include lists to deal with an elevator. This involves creating an include list each time a user selects a video device located in an elevator. The include list is associated with a device in a current elevator lobby, and should comprises devices in the elevator and the elevator lobbies immediately above and below the current lobby. As the elevator moves, the user watches the various elevator lobby views (there would likely be 3 at any time), and as the elevator reaches each next lobby, the operator would select a perimeter video device corresponding to that lobby, and the process would repeat. This would allow a user to, as the elevator moved, track the target floor to floor while also watching for the target to exit the elevator.

In some embodiments, the virtual tracking process 140-2 may use conventions to simplify the management of presets of fields of view for video devices. For example, a preset of one may be set to indicate a northerly field of view, a preset of two may be set to indicate a southerly field of view, and so on. Thus, the virtual tracking process 140-2 specifies, in the database containing information on the plurality of video devices, relative positions of each video device and/or its preset(s). The virtual tracking process 140-2 may then use the geo engine to, for a selected location, find the video devices that surround a current main video device using those relative positions, instead of engaging in more complicated spot calculations.

Further, in some embodiments, while the virtual tracking process 140-2 is executing, a user is able to select, via the graphical user interface or otherwise, a function that causes one or more video devices to perform a frame capture. The frame capture is then available to other processes, for analysis, exporting, and the like. The frame capture is also available to the virtual tracking process 140-2 itself for, for example, use during playback of recorded data, or to be used as analytic data to assist in tracking a subject.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory (i.e., solid state memory) device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many skilled in the art may make many additional changes in the details, materials, and arrangement of parts, herein described and illustrated.

What is claimed is:

1. A method of tracking a target across a region using a plurality of video devices, comprising:
   providing a graphical user interface, wherein the graphical user interface displays, in a first region, video from a current field of view of a main video device, and, in a plurality of second regions, video from a field of view corresponding to each of a plurality of perimeter video devices, the field of view of each perimeter video device being proximate to the field of view of the main video device, the field of view defining a position based on a camera pointing direction and on static or dynamic movement of the perimeter video devices independent of the location of the perimeter video devices;
   receiving a selection of one of the plurality of perimeter video devices; and in response:
   displaying video from a field of view of the selected perimeter video device in the first region;
   calculating a distance and direction from the field of view of the selected perimeter video device to proximate fields of view of other proximate video devices;
   identifying a plurality of candidate perimeter video devices based on the calculated distance and direction, the calculated distance and direction based on the field of view of the corresponding video device;
   using the calculated distance and direction to discard one or more candidate perimeter video devices from the plurality of candidate perimeter video devices; and
   repopulating the plurality of second regions with video from a field of view corresponding to each of the plurality of identified candidate perimeter video devices.

2. The method of claim 1 comprising:
   recording video from a subset of the plurality of video devices; and
   playing a subset of the recorded video backwards in the graphical user interface to track a target back through a period of time by repeating the steps of receiving, displaying, identifying, and repopulating, the subset of the recorded video used throughout the repeated steps.

3. The method of claim 2 comprising:
   ceasing backwards playback of the subset of the recorded video at a point; and
   playing a subset of the recorded video forward from the point to track a second target, the second target tracked by repeating the steps of receiving, displaying, identifying, and repopulating, the subset of the recorded video used throughout the repeated steps.

4. The method of claim 1 comprising:
   prior to displaying video from a field of view of a video device, identifying a plurality of fields of view associated with that video device, each field of view associated with a position of the video device;
   selecting a field of view of the video device that is optimally proximate to the field of view of the main video device;
   directing the video device to move to the position associated with the selected field of view;
   recording an initial position of the video device; and
   upon video from the video device no longer being displayed in the graphical user interface, directing the video device to return to the initial position.

5. The method of claim 1 wherein identifying comprises:
   identifying a plurality of candidate perimeter video devices, wherein at least one candidate perimeter video device has an include list, the include list comprising one or more video devices associated with the candidate perimeter video device, any video device on the include list automatically added to the plurality of candidate perimeter video devices.

6. The method of claim 1 wherein identifying comprises:
identifying a plurality of candidate perimeter video devices, wherein at least one candidate perimeter video device has an exclude list, the exclude list comprising one or more video devices associated with the candidate perimeter video device, any video device on the exclude list automatically disqualified from being part of the plurality of candidate perimeter video devices.

7. The method of claim 1 wherein receiving comprises:
selecting one of the plurality of perimeter video devices automatically through use of analytics, the analytics including relations of distance, probability, passability or priority to the field of view of the selected perimeter video device.

8. The method of claim 1 wherein identifying candidate perimeter video devices includes probability, further comprising:
computing, for each candidate perimeter video device, the most likely fields of view for which a target will move into to determine a probability for that candidate perimeter video device, and
selecting the perimeter video devices based on the computed probability.

9. The method of claim 1 wherein identifying candidate perimeter video devices includes distance, further comprising
computing, for each candidate perimeter video device, a distance from the selected perimeter video device, and
selecting the perimeter video devices based on the computed distance.

10. The method of claim 1 further comprising defining an obstruction mapping for each of the video devices, the obstruction mapping modeling a region in which a target may be tracked by using a coordinate system for assigning a location to each video device, the obstruction mapping defining a passability relation indicating physical deterrents to passage that affect likelihood of transition to a field of view of each video device.

11. The method of claim 10 wherein the coordinate space includes z coordinate indicative of a vertical orientation in addition to x, y horizontal plane coordinates, the z component indicative of multiple floors or elevators.

12. The method of claim 10 wherein identifying candidate perimeter video devices includes priorities, the priorities indicative of video devices having an enhanced need for scrutiny which results the video devices to be selected when they otherwise might not, further comprising assigning stronger priorities to video devices having a field of view more prone to obscurement of tracked targets.

13. The method of claim 1, further comprising:
modeling a region in which a target may be tracked by using a coordinate space; and
relating the fields of view of the perimeter video devices to a coordinate space.

14. The method of claim 13 further comprising:
assigning units of the coordinate space to the modeled region; and
defining the fields of view to the units of the coordinate space relative to the modeled region.

15. The method of claim 14 wherein the units of the coordinate space are in terms of a building fixture or latitude/longitude.

16. The method of claim 15 wherein the coordinate space defines an origin based on a structural landmark in a monitored space, and the units are based on a fixture distance in the monitored space.

17. The method of claim 1 further comprising:
computing a distance and direction of each candidate perimeter video device in a coordinate space; and
using the computed distance and direction to identify candidate perimeter video devices for repopulating the plurality of second regions.

18. The method of claim 1 wherein the identified candidate perimeter video devices define the plurality of perimeter video devices, further comprising:
iteratively receiving the selection of one of the plurality of perimeter video devices for display in the first region; and
repeating identifying the candidate perimeter video devices based on an expected path of a tracked subject.

19. The method of claim 18 further comprising identifying the candidate perimeter video devices further based on a line approximating a line of travel of a subject, the line based on previous fields of view traversed by the subject.

20. The method of claim 1 wherein the plurality of candidate perimeter video devices are further identified based on a likely next field of view of the subject, the next likely field of view based on a line of travel of the subject and physical barriers in the field of view of the main and candidate perimeter video devices.

21. The method of claim 1 further comprising:
identifying a spot indicative of a center of a field of view corresponding to the selection;
determining a coordinate position of the identified spot;
calculating a distance between adjacent fields of view based on the determined coordinate positions; and
selecting candidate perimeter video devices based on an ordering of the calculated distance.

22. The method of claim 21 wherein identified spot is based on a field of view obtained from multiple positions of a video device including a PTZ (pan/tilt/zoom) video camera.

23. The method of claim 1 wherein the position includes a range of fields of view based on dynamic movement of the perimeter video device.

24. A computer program product, stored on a non transitory computer readable medium having instructions that, when executed by a processor, cause the processor to perform a method for tracking a target across a region using a plurality of video devices, comprising:
a processor responsive to the instructions;
computer program code for providing a graphical user interface, wherein the graphical user interface displays, in a first region, video from a field of view corresponding to a main video device, and, in a plurality of second regions, video from a field of view of each of a plurality of perimeter video devices, the field of view of each perimeter video device being proximate to the field of view of the main video device;
computer program code for receiving a selection of one of the plurality of perimeter video devices;
and in response:
computer program code for displaying video from a field of view of the selected perimeter video device in the first region, the field of view defining a position based on a camera pointing direction and on movement of the perimeter video device independent of the location of the perimeter video device;

computer program code for calculating a distance and direction from the field of view of the selected perimeter video device to proximate fields of view of other proximate video devices;

computer program code for identifying a plurality of candidate perimeter video devices based on the calculated distance and direction, the calculated distance and direction based on the field of view of the corresponding perimeter video device;

computer program code for using the calculated distance and direction to discard one or more candidate perimeter video devices from the plurality of candidate perimeter video devices; and computer program code for repopulating the plurality of second regions with video from a field of view corresponding to each of the plurality of identified candidate perimeter video devices.

25. The computer program product of claim 24 comprising:

computer program code for recording video from a subset of the plurality of video devices; and computer program code for playing a subset of the recorded video backwards in the graphical user interface to track a target back through a period of time by repeating the steps of receiving, displaying, identifying, and repopulating, the subset of the recorded video used throughout the repeated steps.

26. The computer program product of claim 25 comprising:

computer program code for ceasing backwards playback of the subset of the recorded video at a point; and computer program code for playing a subset of the recorded video forward from the point to track a second target, the second target tracked by repeating the steps of receiving, displaying, identifying, and repopulating, the subset of the recorded video used throughout the repeated steps.

27. A computer system comprising:
a memory;
a processor;
a display;
a network interface; and
an interconnection mechanism coupling the memory, the processor, the display, and the network interface, allowing communication there between; wherein the memory of the computer system is encoded with a virtual tracking application, that when executed in the processor, provides a virtual tracking process that tracks a target across a region using a plurality of video devices, by causing the computer system to perform operations of:
providing a graphical user interface, wherein the graphical user interface displays, in a first region, video from a field of view of a main video device, and, in a plurality of second regions, video from a field of view corresponding to each of a plurality of perimeter video devices, the field of view of each perimeter video device being proximate to the field of view of the main video device, the field of view defining a position based on a camera pointing direction and on static or dynamic movement of the perimeter video device independent of the location of the perimeter video device;
receiving a selection of one of the plurality of perimeter video devices; and in response:
displaying video from a field of view of the selected perimeter video device in the first region;
calculating a distance from the field of view of the selected perimeter video device to proximate fields of view of other proximate video devices;
identifying a plurality of candidate perimeter video devices based on the calculated distance and direction, the calculated distance and direction based on the field of view of the corresponding video device;
using the calculated distance and direction to discard one or more candidate perimeter video devices from the plurality of candidate perimeter video devices; and
repopulating the plurality of second regions with video from a field of view corresponding to each of the plurality of identified candidate perimeter video devices.

28. The computer system of claim 27 comprising:
recording video from a subset of the plurality of video devices; and
playing a subset of the recorded video backwards in the graphical user interface to track a target back through a period of time by repeating the steps of receiving, displaying, identifying, and repopulating, the subset of the recorded video used throughout the repeated steps.

29. The computer system of claim 28 comprising:
ceasing backwards playback of the subset of the recorded video at a point; and
playing a subset of the recorded video forward from the point to track a second target, the second target tracked by repeating the steps of receiving, displaying, identifying, and repopulating, the subset of the recorded video used throughout the repeated steps.

30. The computer system of claim 27 comprising:
prior to displaying video from a field of view of a video device, identifying a plurality of fields of view associated with that video device, each field of view associated with a position of the video device;
selecting a field of view of the video device that is optimally proximate to the field of view of the main video device; and
directing the video device to move to the position associated with the selected field of view.

31. The computer system of claim 27 wherein identifying comprises:
identifying a plurality of candidate perimeter video devices, each candidate perimeter video device having a location in a coordinate space indicating its distance from the selected perimeter video device; and
using the locations to discard one or more candidate perimeter video devices from the plurality of candidate perimeter video devices.

32. In a surveillance area for monitoring subjects of interest by selective observation from a plurality of video cameras, a method of rendering video streams received from the cameras comprising:
identifying a subject of interest in the surveillance area, each camera covering a respective field of view in the surveillance area, the field of view defining a position based on a camera pointing direction and on static or dynamic movement of the camera independent of the location of the camera;
rendering the subject on a display by identifying a camera as a main video camera having a main field of view occupied by the subject of interest;
calculating a distance and direction from the field of view of the selected camera to proximate fields of view of other cameras;

computing, based on the calculated distance and direction, the calculated distance and direction based on the field of view of the corresponding camera, a set of candidate perimeter cameras covering fields of view to which the subject of interest is most likely to proceed, each candidate perimeter camera having a location in a coordinate space indicating its distance from the main video camera; the set of candidate perimeter cameras computed by:

applying a series of filters to eliminate, from the set of candidate perimeter cameras, fields of view unlikely to provide a trackable view of the subject, the series of filters including elimination of cameras either too distant from or too close to the main field of view;

evaluating the candidate perimeter cameras by accumulating weighting factors indicative of a strategic tracking value of the fields of view, accumulating including considering a high passability to the field of view, a positioning priority of the field of view and a history of previous subject visits to the field of view as positive weighting factors and considering physical passability obstructions and field of view obscurement as negative weighting factors;

ranking the candidate perimeter cameras according to the accumulated weighting factors;

using the locations to discard one or more candidate perimeter cameras from the plurality of candidate perimeter cameras; and rendering the video streams from the highest ranked candidate perimeter cameras on the video display adjacent to the video stream received from the main camera;

identifying one of the candidate perimeter cameras as a successive main camera depending on which field of view the subject of interest is determined to advance to;

designating the successive main camera as the main camera; and repeating rendering, computing a set of candidate perimeter cameras, and identifying a successive main camera as the subject of interest advances among the fields of view in the surveillance area.

* * * * *